(12) United States Patent
Chen (10) Patent No.: US 7,636,838 B2
(45) Date of Patent: Dec. 22, 2009

(54) METHOD AND SYSTEM FOR HANDLING OPERATION OF MULTIPLE DEVICES WITHIN A SINGLE SYSTEM-ON-CHIP (SOC) INTEGRATED CIRCUIT (IC)

(75) Inventor: Iue-Shuenn I. Chen, San Diego, CA (US)

(73) Assignee: Broadcom Corporation

( * ) Notice: Subject to any disclaimer, the term of this patent is extended or adjusted under 35 U.S.C. 154(b) by 415 days.

(21) Appl. No.: 11/326,065

(22) Filed: Jan. 5, 2006

(65) Prior Publication Data

US 2007/0157012 A1    Jul. 5, 2007

(51) Int. Cl.
*G06F 15/177* (2006.01)
(52) U.S. Cl. .......................................... 713/1; 713/100
(58) Field of Classification Search ...................... 713/1, 713/100
See application file for complete search history.

(56) References Cited

U.S. PATENT DOCUMENTS 7,236,411 B1 * 6/2007 Saini et al. .................. 365/194
2001/0037458 A1 * 11/2001 Kean .......................... 713/193
2005/0091522 A1 * 4/2005 Hearn et al. ................. 713/200
2005/0246582 A1 * 11/2005 Nash et al. ..................... 714/12
2006/0053248 A1 * 3/2006 Janzen et al. ................ 711/105
2007/0052453 A1 * 3/2007 Wald ........................... 327/100

* cited by examiner

*Primary Examiner*—Tse Chen
(74) *Attorney, Agent, or Firm*—McAndrews, Held & Malloy, Ltd.

(57) ABSTRACT

A method for securely handling processing of information may include deactivating within a chip, at least one of a plurality of functions that accesses an on-chip memory and generates output data from input data during operation of the chip. Configuration settings that provide maximum performance when accessing the on-chip memory may be determined using an enabled one of the plurality of functions. Access to the on-chip memory may be enabled using the determined configuration settings during the operation of the chip. Access to the on-chip memory by the plurality of functions that accesses the on-chip memory and generates the output data from the input data may be activated during operation of the chip. The on-chip memory may be accessed using the determined configuration settings by the at least one of the plurality of functions subsequent to the activating.

30 Claims, 5 Drawing Sheets

METHOD AND SYSTEM FOR HANDLING OPERATION OF MULTIPLE DEVICES WITHIN A SINGLE SYSTEM-ON-CHIP (SOC) INTEGRATED CIRCUIT (IC)

RELATED APPLICATIONS

This application claims the benefit of U.S. patent application Ser. No. 11/325,730, filed Jan. 5, 2006, the complete subject matter of which is hereby incorporated by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to securely handling processing of information. More specifically, certain embodiments of the invention relate to a system and method for handling operation of multiple devices within a single system-on-chip (SoC) integrated circuit (IC).

BACKGROUND OF THE INVENTION

In many data processing applications, it may be required that certain data stored in one or more memory regions be continuously, or periodically, monitored and analyzed by a particular client to ensure the integrity of the data in these regions of memory. A secure protocol may be utilized to ensure that the content stored in memory is not changed, replaced, or in any way tampered with, by piracy attempts and/or unauthorized users.

With regard to robust protection of data against tampering, information bearing signals should be protected so as to eliminate unauthorized interception and access by a third party. Some conventional signal security methods utilize signal scrambling where the scrambled signal content is not readily discernable by a receiving party. Efficient scrambling of different kinds of signals such as multimedia broadcasts, for example, may be achieved in such a manner that there is no perceptible deterioration in signal quality when these signals are being restored. With either a conditional access (CA) system or a copy protection system, private or secure keys may be utilized for scrambling and/or descrambling high-value content or for protecting highly sensitive transactions. In a CA system, a content scrambling key is utilized and this content scrambling key has to be protected.

For a complex computer or a System on Chip (SoC) integrated circuit solution, there may be many clients in the SoC that access the memory for fetching instructions and/or data, for example. In addition, clients may be adapted to exchange information with each other via a communication bus. Such clients within the SoC may be adapted to access the memory through a memory bus. An unauthorized user may attempt to tap into the memory bus or the communication bus from outside of the SoC in order to monitor the data access patterns of the SoC clients and to attempt an unauthorized signal access. Furthermore, a plurality of clients that are external or internal to the SoC may attempt an unauthorized access to one or more regions of the on-chip memory, or to one or more of the clients within the chip.

A client or a CPU within the SoC integrated circuit may be adapted to verify operation of the remaining clients within the chip and whether an unauthorized access attempt has been performed by an unauthorized user. However, an unauthorized user may attempt to tap into the memory bus, the communication bus or any of the clients during, for example, a boot sequence for initially booting the chip prior to operation. Since the verifying functionality of the clients within the chip may be suspended during the boot sequence, it may be difficult to prevent an unauthorized attempt to access the chip, such as an attempt to read and/or write to the on-chip memory.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for handling operation of multiple devices within a single system-on-chip (SoC) integrated circuit (IC), substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for handshake protocol between multiple bus masters within a single system-on-chip (SoC) integrated circuit (IC). Within a multiple CPU SoC integrated circuit solution, each chip may be adapted to communicate with each other via various protocols defined by the chip architecture. For example, each chip may utilize a determined protocol to perform a boot sequence and the chip may be exposed to unauthorized access if the predefined boot sequence protocol is violated. Within the SoC IC, one or more guard CPUs may be utilized to monitor chip operation and perform corrective actions, if necessary. For example, the guard CPU may be adapted to enable and disable decoding functionality within the chip. To enforce a strong dependency protocol within the chip, the guard CPU may be adapted to disable chip functionality and enable it after a determined boot sequence, for example, is executed and an acknowledgement of successful boot sequence completion is communicated to the guard CPU. In one embodiment of the invention, at least one of a plurality of functions that accesses an on-chip memory and generates output data from input data may be deactivated within a chip during operation of the chip. Configuration settings that provide maximum performance when accessing the on-chip memory may be determined using an enabled one of the plurality of functions. Access to the on-chip memory may be enabled using the determined configuration settings during the operation of the chip.

Figure 1:
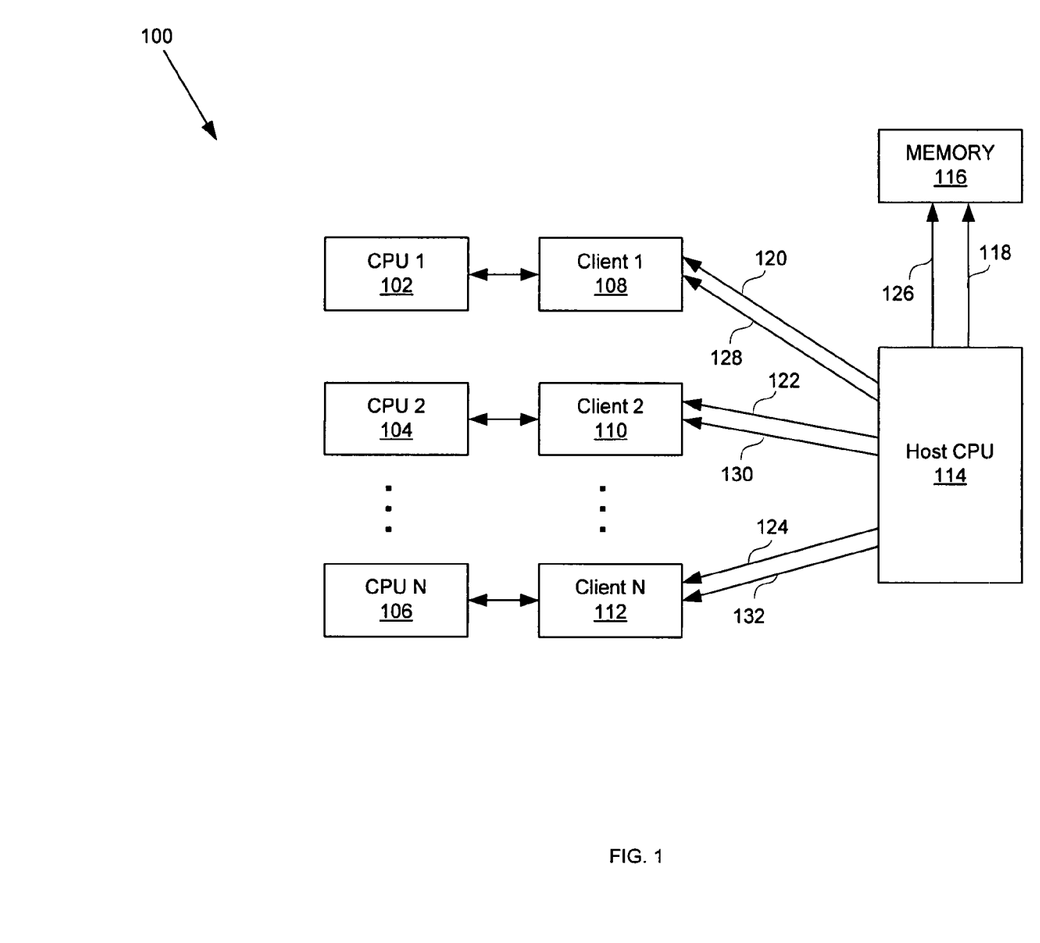
FIG. 1 is a block diagram illustrating an exemplary multiple CPU system for securely handling processing of information utilizing a single host/guard CPU, in accordance with an embodiment of the invention.

FIG. 1 is a block diagram illustrating an exemplary multiple CPU system for securely handling processing of information utilizing a single host/guard CPU, in accordance with an embodiment of the invention. Referring to FIG. 1, the multiple CPU system 100 may comprise a plurality of CPUs 102, . . . , 106, a plurality of clients 108, . . . , 112, a host CPU 114 and memory 116.

The memory 116 may comprise on-chip memory. Furthermore, the memory 116 may be partitioned into a plurality of regions, which may be accessed by a plurality of clients 108, . . . , 112. For example, the memory 116 may comprise a protected region, which may be utilized to store protected data, such as demultiplexed audio and/or video bitstream data. Each of the memory clients 108, . . . , 112 or the CPUs 102, . . . , 106 within the system 100 may have access to a determined number of the memory regions, and data may be communicated within the system 100 in a defined and controlled manner. A system and method for partitioning multiple logical memory regions with access control by a central control agent is described in U.S. patent application Ser. No. 11/325,730, filed Jan. 5, 2006, which is incorporated herein by reference in its entirety.

The clients 108, . . . , 112 may comprise suitable circuitry, logic, and/or code and may be adapted to process data within the multiple CPU system 100. For example, one or more of the plurality of clients 108, . . . , 112 may perform transport bitstream processing, such as demultiplexing and parsing, decoding and/or encoding of data. The CPUs 102, . . . , 106 may be utilized by the corresponding clients 108, . . . , 112, respectively, during the processing of the data within the multiple CPU system 100. In one embodiment of the invention, the CPUs 102, . . . , 106 may be implemented within their corresponding clients 108, . . . , 112.

The host CPU 114 may comprise a million-instructions-per-second (MIPS) processor or other type of CPU, which may oversee data processing by the clients 108, . . . , 112 and the corresponding CPUs 102, . . . , 106. The host CPU 114 may also control access by one or more of the processing clients 108, . . . , 112 or the CPUs 102, . . . , 106 to the on-chip memory 116. In this regard, the host CPU 114 may be adapted to communicate one or more general processing instructions (GPIs) to the memory 116, the clients 108, . . . , 112, and/or to the corresponding CPUs 102, . . . , 106. For example, the host CPU 114 may communicate a general processing instruction 118 to the memory 116. Similarly, the host CPU 114 may communicate a plurality of general processing instructions 120, . . . , 124 to corresponding clients 108, . . . , 112, respectively. The GPIs 118, . . . , 124 may comprise, for example, a read instruction, a write instruction, data verification instruction, data encoding instruction, data decoding instruction, communication path test instruction, and/or data scrambling instruction.

In an exemplary aspect of the invention, the host CPU 114 may perform one or more guard functionalities within the multiple CPU system 100. For example, the host CPU 114 may monitor data processing functions performed by the clients 108, . . . , 112 within the multiple CPU system 100 and may detect whether the data processing functions are executed correctly. The host CPU 114 may also detect whether an unauthorized access attempt has been made with regard to accessing data processed within the multiple CPU system 100. In response to any detected unauthorized access attempt or if a data processing function is not executed properly, the host CPU 114 may generate a remedial guard instruction. The remedial guard instruction may comprise a disable instruction, an enable instruction, and/or a reset instruction, for example.

For example, if the host CPU 114 detects an unauthorized access attempt by an unauthorized user, the host CPU 114 may generate a guard instruction 126 for the memory 116. The guard instruction 126 may comprise a memory reset instruction or a memory disable instruction, for example. Similarly, guard instructions 128, . . . , 132 may be generated for the plurality of clients 108, . . . , 112, respectively.

In another embodiment of the invention, a handshake protocol may be established to facilitate communication between the CPUs 102, . . . , 106, the clients 108, . . . , 112, the memory 116 and the host CPU 114 during an initial boot of the multiple CPU system 100. For example, an initial boot of the multiple CPU system 100 may include the execution of one or more general processing instructions generated by the host processor 114. The general processing instructions may be executed in a determined sequence to complete the initial boot. For example, during an initial boot, the host processor 114 may generate GPIs 120 and 122 to clients 108 and 110. The GPIs 120 and 122 may comprise instructions for running one or more test patterns to the memory 116 so that the host CPU 114 may adjust an optimal clock rate prior to completion of the initial boot sequence. After the test patterns were generated and an optimal clock rate of the host CPU 114 configured, the initial boot sequence may be considered complete and normal data processing operation may be initiated within the multiple CPU system 100.

In this regard, a strong event dependency protocol may be established within the multiple CPU system 100 since the host processor 114 may generate one or more guard instructions after a successful execution of the initial boot sequence. As used herein, a strong event dependency protocol may signify that a plurality of events, such as establishing a handshake between devices and communicating information between devices, for example, may be performed in a certain pre-determined order. The order events are performed may be determined by, for example, a chip architecture specification. Since guard instructions and general processing instructions are both generated by the host CPU 114, proper data processing functionality of the multiple CPU system 100 may depend on whether the host CPU 114 is operating properly and in a secure manner, according to, for example, architecture specifications of the multiple CPU system 100.

Figure 2:
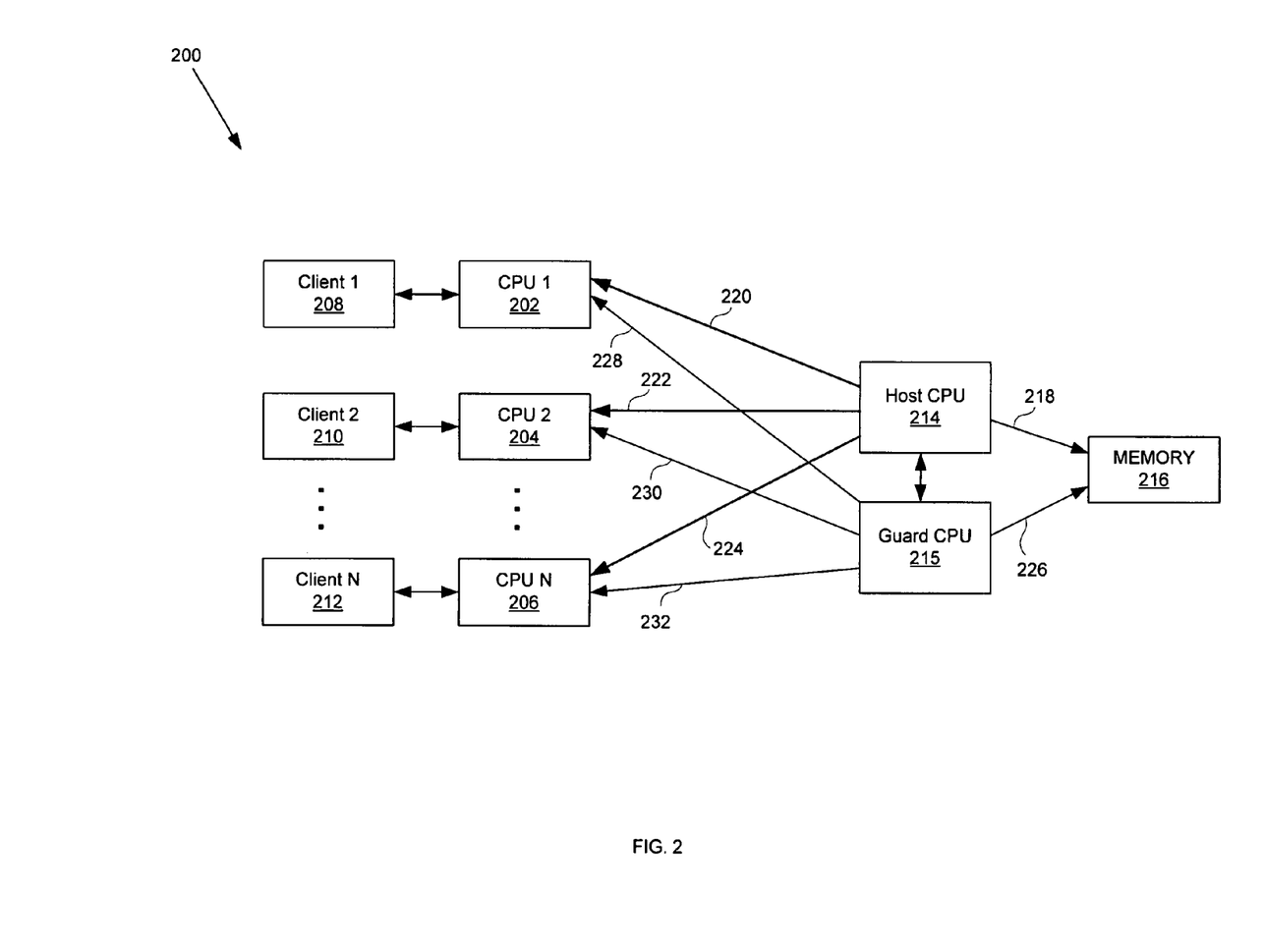
FIG. 2 is a block diagram illustrating an exemplary multiple CPU system for securely handling processing of information utilizing a separate host CPU and a guard CPU, in accordance with an embodiment of the invention.

In one embodiment of the invention, operation of the multiple CPU system 100 may be improved by separating the general processing instruction functionalities and the guard instruction functionalities to be handled by separate CPUs. FIG. 2 is a block diagram illustrating an exemplary multiple CPU system for securely handling processing of information utilizing a separate host CPU and a guard CPU, in accordance with an embodiment of the invention. Referring to FIG. 2, the multiple CPU system 200 may comprise a plurality of CPUs 202, ..., 206, a plurality of clients 208, ..., 212, a host CPU 214, a guard CPU 215, and memory 216.

The memory 216 may comprise on-chip memory. Furthermore, the memory 216 may be partitioned into a plurality of regions, which may be accessed by a plurality of clients 208, ..., 212. For example, the memory 216 may comprise a protected region, which may be utilized for storing protected data, such as demultiplexed audio and/or video bitstream data. Each memory client 208, ..., 212 or the CPUs 202, ..., 206 within the system 200 may have access to one or more specific memory regions. This partitioning and controlled access to the memory ensures that data is communicated within the system 100 in a defined and predictable manner.

The clients 208, ..., 212 may comprise suitable circuitry, logic, and/or code and may be adapted to process data within the multiple CPU system 200. For example, one or more of the plurality of clients 208, ..., 212 may perform transport bitstream processing, such as demultiplexing and parsing, decoding and/or encoding of data. The CPUs 202, ..., 206 may be utilized by the corresponding clients 208, ..., 212, respectively, during the processing of the data within the multiple CPU system 200. In one embodiment of the invention, the CPUs 202, ..., 206 may be implemented within their corresponding clients 208, ..., 212.

The host CPU 214 may comprise, for example, a million-instructions-per-second (MIPS) processor, which may oversee data processing by the clients 208, ..., 212 and the corresponding CPUs 202, ..., 206. The host CPU 214 may also control access by one or more of the processing clients 208, ..., 212 or the CPUs 202, ..., 206 to the on-chip memory 216. In this regard, the host CPU 214 may be adapted to communicate one or more general processing instructions (GPIs) to the memory 216, the clients 208, ..., 212, and/or to the corresponding CPUs 202, ..., 206. For example, the host CPU 214 may communicate a general processing instruction 218 to the memory 216. Similarly, the host CPU 214 may communicate a plurality of general processing instructions 220, ..., 224 to corresponding clients 208, ..., 212, respectively. The GPIs 218, ..., 224 may comprise, for example, a read instruction, a write instruction, data verification instruction, data encoding instruction, data decoding instruction, communication path test instruction, and/or data scrambling instruction.

The guard CPU 215 may comprise suitable circuitry, logic, and/or code and may be adapted to perform one or more guard functionalities within the multiple CPU system 200. For example, the guard CPU 215 may monitor data processing functions performed by the clients 208, ..., 212 within the multiple CPU system 200 and may detect whether the data processing functions are executed correctly. The guard CPU 215 may also detect whether an unauthorized access attempt has been made with regard to accessing data processed within the multiple CPU system 200. In response to any detected unauthorized access attempt or if a data processing function does not function in a manner in which it is intended, the guard CPU 215 may generate a remedial guard instruction. The remedial guard instruction may comprise a disable instruction, an enable instruction, and/or a reset instruction, for example. For example, if the guard CPU 215 detects an unauthorized access attempt by an unauthorized user, the guard CPU 215 may generate a guard instruction 226 for the memory 216. The guard instruction 226 may comprise a memory reset instruction or a memory disable instruction, for example. Similarly, guard instructions 228, ..., 232 may be generated for the plurality of clients 208, ..., 212, respectively.

In another embodiment of the invention, a handshake protocol may be established for the CPUs 202, ..., 206, the clients 208, ..., 212, the memory 216, the guard CPU 215, and the host CPU 214 during an initial boot of the multiple CPU system 200. For example, an initial boot of the multiple CPU system 200 may include the performance of one or more general processing instructions generated by the host processor 214. The general processing instructions may be executed in a determined sequence to complete the initial boot. For example, during an initial boot, the host processor 214 may generate GPIs 220 and 222 to clients 208 and 210. The GPIs 220 and 222 may comprise instructions for running one or more test patterns to the memory 216 so that the host CPU 214 may adjust an optimal clock rate prior to completion of the initial boot sequence. After the test patterns were generated and an optimal clock rate of the host CPU 214 configured, the initial boot sequence may be considered complete and normal data processing operation may be initiated within the multiple CPU system 200.

After the initial boot sequence within the multiple CPU system 200 is complete, the host CPU 214 may communicate an acknowledgement to the guard CPU 215. In response to the received acknowledgement, the guard CPU 215 may initiate monitoring of data processing within the multiple CPU system 200 and, if needed, generation of guard instructions 226, ..., 232. In this regard, a strong event dependency protocol may be established within the multiple CPU system 200 since the guard processor 215 may generate one or more guard instructions after a successful execution of the initial boot sequence and receipt of an acknowledgement from the host CPU 214.

In another embodiment of the invention, establishing a handshake protocol between the guard CPU 215 and the remaining CPUs within the multiple CPU system 200 utilizing a deactivation function may further increase data processing efficiency within the multiple CPU system 200. For example, during an initial boot of the multiple CPU system 200, the guard CPU 215 may boot first. After successful completion of the guard CPU 215 boot, the guard CPU 215 may deactivate within the chip one or more data processing functions. For example, the guard CPU 215 may deactivate a data encoding function, a data decoding function, and/or a data processing function that accesses the on-chip memory 216, such as memory read or memory write function. After the guard CPU 215 deactivates the one or more data processing functions, the remaining boot sequence may be executed. A data decoding function may comprise decoding data communicated within the multiple CPU system 200, and a data encoding function may comprise encoding data communicated within the multiple CPU system 200.

During the remaining boot sequence, the host CPU 214 may generate one or more general processing instructions 218, ..., 224. For example, the host processor 214 may determine configuration settings, such as an optimal clock rate, that provide maximum performance during data processing within the multiple CPU system 200. After the remaining boot sequence is complete, the host CPU 214 may communicate an acknowledgement to the guard CPU 215. Upon receipt of the acknowledgement from the host CPU 214, the guard CPU 215 may activate the deactivated one or more data processing functions prior to resuming normal data processing operations within the multiple CPU system 200.

Figure 3:
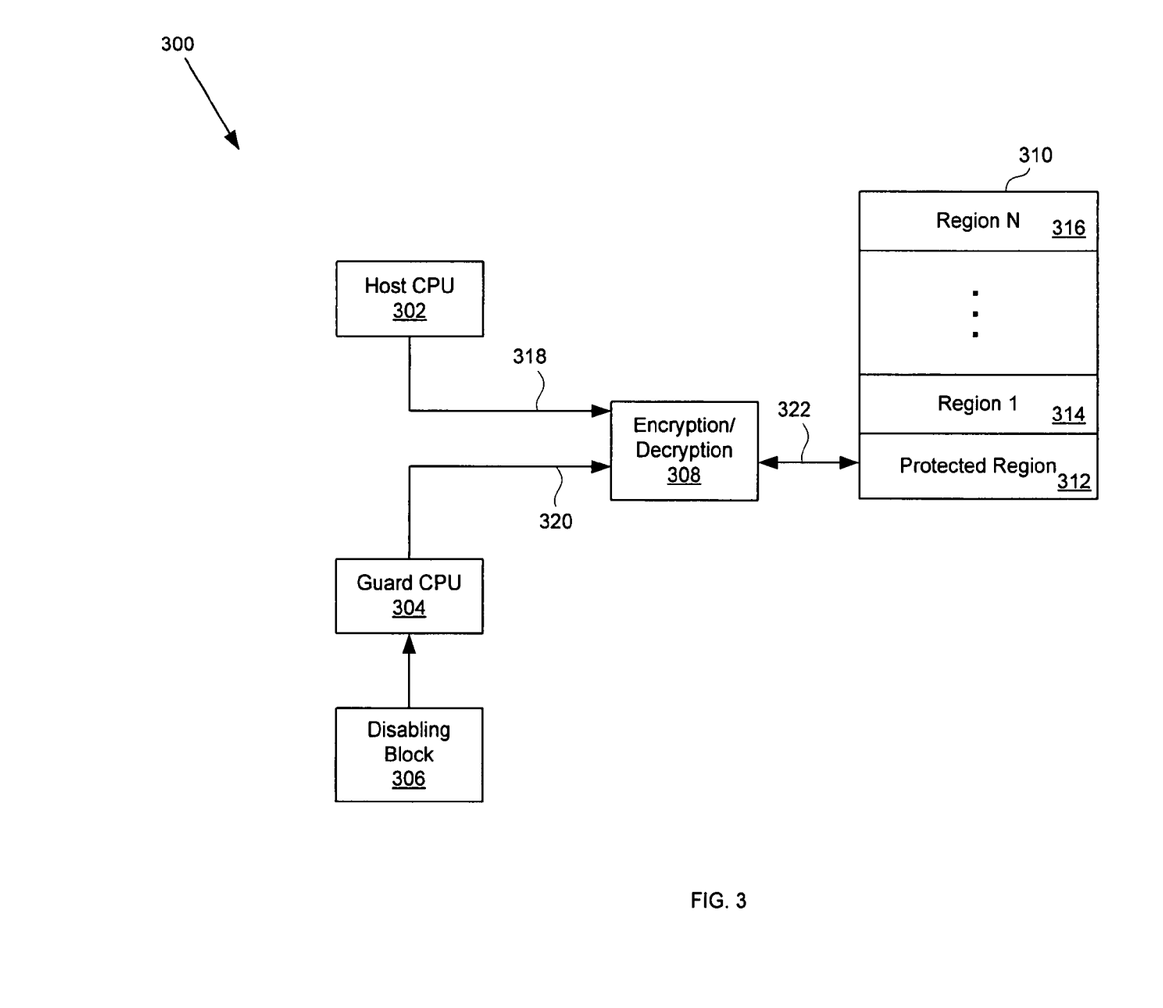
FIG. 3 is a block diagram illustrating an exemplary multiple CPU system for establishing a handshake protocol and securely accessing on-chip memory utilizing a guard CPU, in accordance with an embodiment of the invention.

FIG. 3 is a block diagram illustrating an exemplary multiple CPU system for establishing a handshake protocol and securely accessing on-chip memory utilizing a guard CPU, in accordance with an embodiment of the invention. Referring to FIG. 3, the multiple CPU system 300 may comprise a host CPU 302, a guard CPU 304, a disabling block 306, an encryption/decryption block 308, and memory 310.

The memory 310 may comprise on-chip memory. Furthermore, the memory 310 may be partitioned into a plurality of regions 314, ..., 316, which may be accessed by a plurality of on-chip clients within the system 300, such as the encryption/decryption block 308. The memory 310 may further comprise a protected region 312, which may be utilized for storing protected data, such as demultiplexed audio and/or video bitstream data. Clients within the multiple CPU system 300 may have access to a determined number of the memory regions, and data may be communicated within the system 300 in a defined and controlled manner.

The encryption/decryption block 308 may comprise suitable circuitry, logic, and/or code and may be utilized to encrypt and/or decrypt data within the multiple CPU system 300. The encrypted data may be communicated from the encryption/decryption block 308 to the on-chip memory 310 via the communication link 322. The encrypted data may then be stored into the protected region 312 of the on-chip memory 310. During processing of data, encrypted data may be read from the protected region 312 and may be decrypted by the encryption/decryption block 308.

The host CPU 302, for example a MIPS processor, may oversee data processing within the multiple CPU system 300. The host CPU 302 may also control access by the encryption/decryption block 308 to the on-chip memory 310. In this regard, the host CPU 302 may communicate a general processing instruction (GPI) 318 to the encryption/decryption block 308 related to accessing data within the protected region 312. The GPI 318 communicated to the encryption/decryption block 308 may comprise, for example, a read instruction, a write instruction, data verification instruction, data encoding instruction, data decoding instruction, communication path test instruction, and/or data scrambling instruction.

The guard CPU 304 may comprise suitable circuitry, logic, and/or code and may perform one or more guard functionalities within the multiple CPU system 300, similar to the guard functionalities of the guard CPU 215 described above with regards to FIG. 2. The disabling block 306 may comprise suitable circuitry, logic, and/or code and may be adapted to generate one or more disabling instructions for the guard CPU 304. The guard CPU 304 may disable and/or deactivate one or more functions within the chip that accesses the on-chip memory 310, for example.

In an exemplary embodiment of the invention, establishing a handshake protocol between the guard CPU 304 and the host CPU 302 within the multiple CPU system 300 utilizing a deactivation function may further increase data processing efficiency within the multiple CPU system 200. For example, during an initial boot of the multiple CPU system 300, the guard CPU 304 may boot first. After successful completion of the guard CPU 304 boot, the disabling block 306 may communicate a deactivation instruction to the guard CPU 304 for deactivating, for example, the decrypting function of the encryption/decryption block 308. After the guard CPU 304 deactivates the decrypting function of the encryption/decryption block 308, the remaining boot sequence may be executed.

During the remaining boot sequence, the host CPU 302 may generate a general processing instruction 318 for the encryption/decryption block 308. For example, the host processor 302 may run test patterns to determine configuration settings, such as an optimal clock rate, that provide maximum performance during data processing within the multiple CPU system 300. After the remaining boot sequence is complete, the host CPU 302 may communicate an acknowledgement to the guard CPU 304. Upon receipt of the acknowledgement from the host CPU 302, the guard CPU 304 may activate the deactivated decrypting function of the encryption/decryption block 308 prior to resuming normal data processing operations within the multiple CPU system 300.

Figure 4:
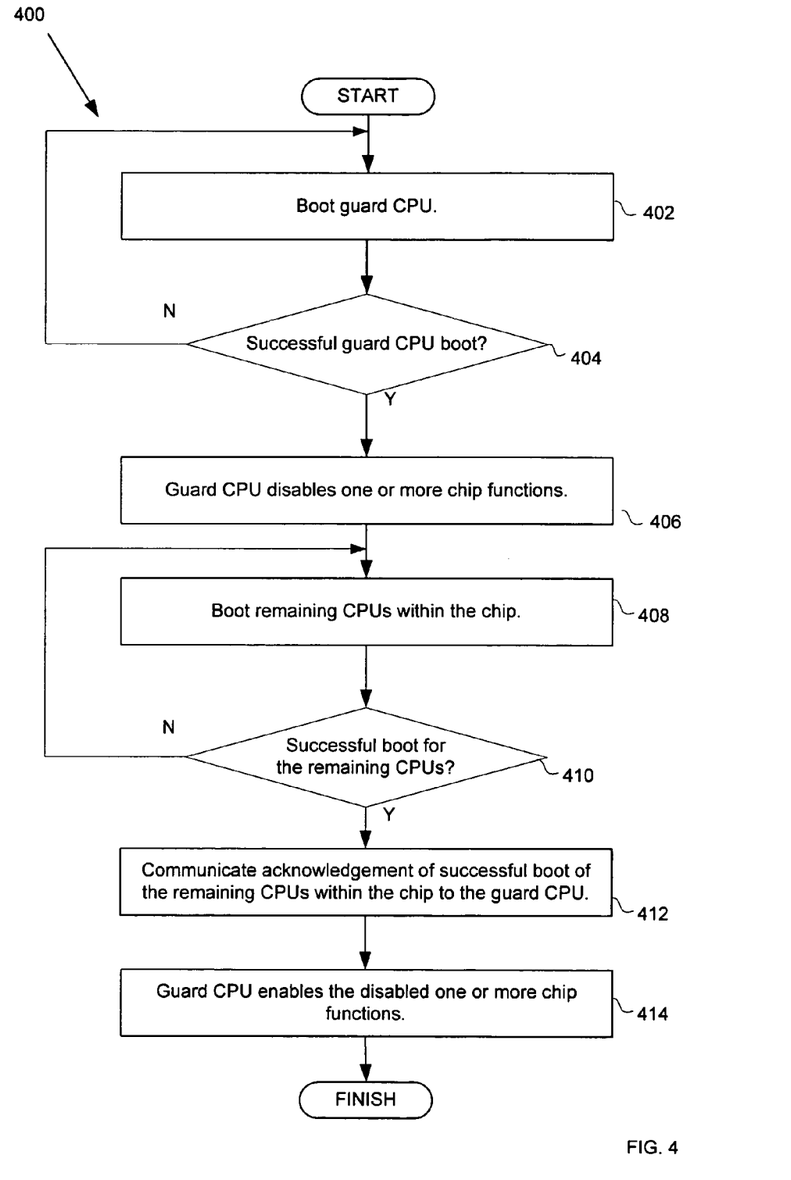
FIG. 4 is a flow diagram illustrating exemplary steps for establishing a handshake protocol securely handling processing of information, in accordance with an embodiment of the invention.

FIG. 4 is a flow diagram illustrating exemplary steps for establishing a handshake protocol securely handling processing of information, in accordance with an embodiment of the invention. Referring to FIGS. 2 and 4, at 402, the guard CPU 215 may boot during an initial boot sequence. At 404, it may be determined whether the guard CPU 215 performed a successful boot. If the boot of the guard CPU 215 was not successful, step 402 may be repeated. If the guard CPU 215 performed a successful boot, at 406, the guard CPU 215 may disable one or more chip functions within the multiple CPU system 200. At 408, the remaining CPUs 204, ..., 206 may perform a boot. At 410, it may be determined whether the boot of the remaining CPUs 202, ..., 206 was successful. If the boot of the remaining CPUs 202, ..., 206 was not successful, step 408 may be repeated. If the boot of the remaining CPUs 202, ..., 206 was successful, at 412, an acknowledgement of the successful boot of the remaining CPUs 202, ..., 206 may be communicated to the guard CPU 215. At 414, the guard CPU 215 may enable the disabled one or more chip functions.

Figure 5:
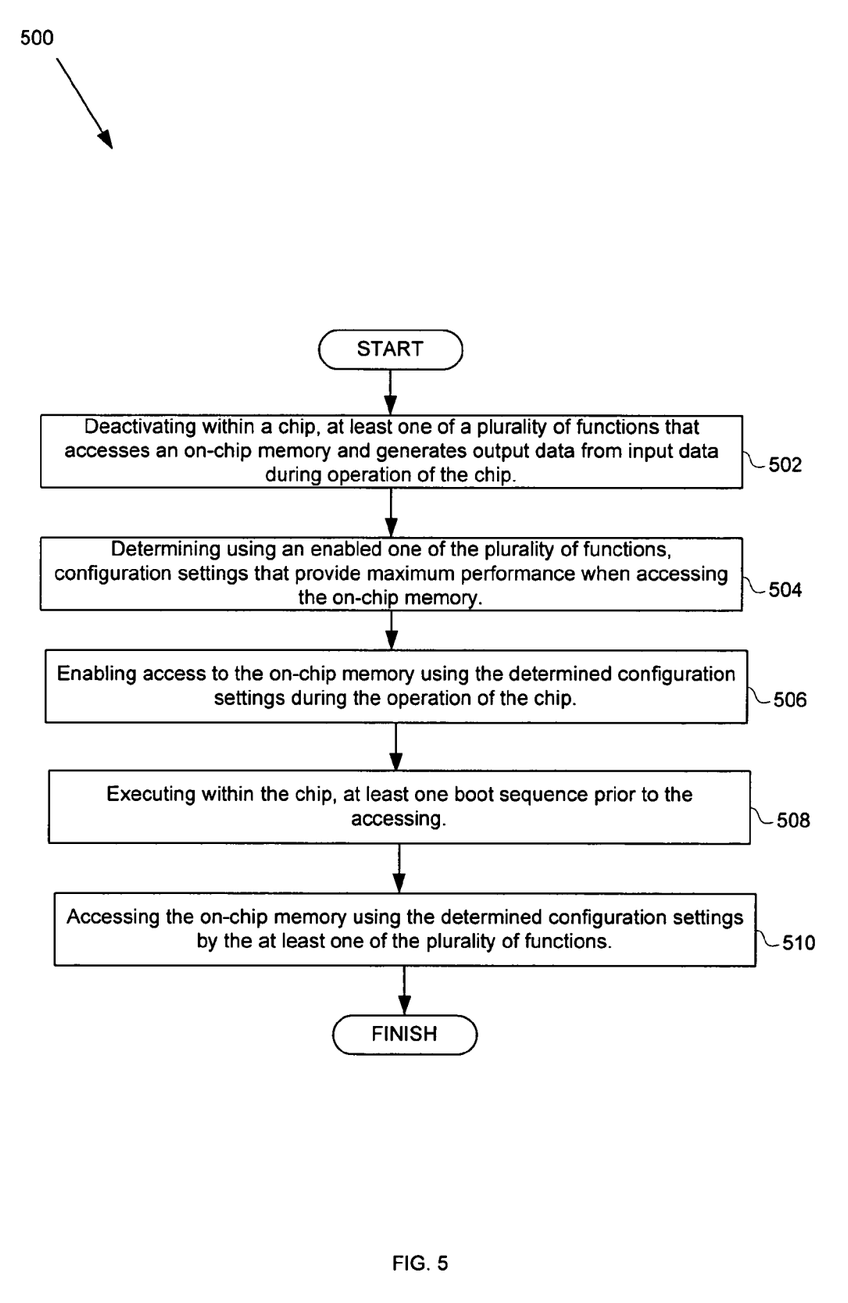
FIG. 5 is a flow diagram illustrating exemplary steps for securely handling processing of information, in accordance with an embodiment of the invention.

FIG. 5 is a flow diagram illustrating exemplary steps for securely handling processing of information, in accordance with an embodiment of the invention. Referring to FIGS. 2 and 5, at 502, at least one of a plurality of functions that accesses an on-chip memory 216 and generates output data from input data may be deactivated within a chip, during operation of the chip. At 504, configuration settings that provide maximum performance when accessing the on-chip memory 216 may be determined using an enabled one of the plurality of functions. At 506, access to the on-chip memory 216 may be enabled using the determined configuration settings during operation of the chip. At 508, at least one boot sequence may be executed within the chip prior to the accessing. At 510, the on-chip memory may be accessed using the determined configuration settings by the at least one of the plurality of functions.

Another embodiment of the invention may provide a machine-readable storage having stored thereon, a computer program having at least one code section for securely handling processing of information. One or more of the code sections may be executable by a machine for causing the machine to perform steps as disclosed herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for securely handling processing of information, the method comprising:
    performing by at least a processor internal to a chip, functions comprising:
        deactivating within said chip, at least one of a plurality of data processing functions at a start of a boot sequence operation of said chip, said plurality of data processing functions comprising one or both of accessing data from an on-chip memory and/or generating output data from input data;
        determining, during said boot sequence operation of said chip, one or more configuration settings that provide maximum performance when accessing said on-chip memory; and
        enabling access to said on-chip memory using said determined configuration settings upon completion of said boot sequence operation of said chip.

2. The method according to claim 1, comprising activating access to said on-chip memory by said plurality of data processing functions that access said on-chip memory and generate said output data from said input data upon completion of said boot sequence operation of said chip.

3. The method according to claim 2, comprising accessing said on-chip memory using said determined configuration settings by said at least one of said plurality of data processing functions subsequent to said activating.

4. The method according to claim 3, wherein said at least one of said plurality of data processing functions that access said on-chip memory and generate said output data from said input data during said boot sequence operation of said chip is a decoding function.

5. The method according to claim 3, comprising executing within said chip, one or more boot sequences to at least an additional CPU within said chip prior to said accessing.

6. The method according to claim 3, comprising authenticating access to said on-chip memory by said at least one of said plurality of data processing functions prior to said accessing.

7. The method according to claim 3, comprising scrambling contents of at least a portion of said on-chip memory prior to said accessing.

8. The method according to claim 1, comprising disabling at least one of said plurality of data processing functions that controls secure access to said on-chip memory.

9. The method according to claim 1, wherein said determining of said one or more configuration settings comprises optimizing at least a clock rate of another processor internal to said chip, that accesses said on-chip memory.

10. The method according to claim 9, wherein said another processor communicates at least one test pattern to said on-chip memory during said determining of said one or more configuration settings.

11. A system for securely handling processing of information, the system comprising:
    at least one processor internal to a chip, said at least one processor enables deactivation within said chip, of at least one of a plurality of data processing functions at a start of a boot sequence operation of said chip, said plurality of data processing functions comprising one or both of accessing data from an on-chip memory and/or generating output data from input data;
    said at least one processor enables determination, of during said boot sequence operation of said chip, one or more configuration settings that provide maximum performance when accessing said on-chip memory; and
    said at least one processor enables access to said on-chip memory using said determined configuration settings upon completion of said boot sequence operation of said chip.

12. The system according to claim 11, wherein said at least one processor enables activation of access to said on-chip memory by said plurality of data processing functions that access said on-chip memory and generate said output data from said input data upon completion of said boot sequence operation of said chip.

13. The system according to claim 12, wherein said at least one processors enables access to said on-chip memory using said determined configuration settings by said at least one of said plurality of data processing functions subsequent to said activating.

14. The system according to claim 13, wherein said at least one of said plurality of data processing functions that access said on-chip memory and generate said output data from said input data during said boot sequence operation of said chip is a decoding function.

15. The system according to claim 13, wherein said at least one processor enables execution within said chip of one or more boot sequences to at least an additional CPU within said chip prior to said accessing.

16. The system according to claim 13, wherein said at least one processor enables authentication of access to said on-chip memory by said at least one of said plurality of data processing functions prior to said accessing.

17. The system according to claim 13, wherein said at least one processor enables scrambling of contents of at least a portion of said on-chip memory prior to said accessing.

18. The system according to claim 11, wherein said at least one processor enables disabling of at least one of said plurality of data processing functions that controls secure access to said on-chip memory.

19. The system according to claim 11, wherein said determining of said one or more configuration settings comprises optimizing at least a clock rate of another processor internal to said chip, that accesses said on-chip memory.

20. The system according to claim 19, wherein said another processor enables communication of at least one test pattern to said on-chip memory during said determining of said one or more configuration settings.

21. The method according to claim 1, wherein said deactivating of said data processing functions of said chip is performed by a guard CPU within said chip.

22. The method according to claim 1, wherein said determining of said configuration settings is performed by a host CPU within said chip.

23. The method according to claim 21, comprising establishing a handshake protocol with said guard CPU within said chip, prior to said accessing of data from said on-chip memory.

24. The method according to claim 1, wherein said plurality of data processing functions comprises encrypting and decrypting accessed data from said on-chip memory.

25. The method according to claim 1, wherein said enabled access to said on-chip memory comprises processing a client bit stream by a plurality of CPUs within said chip, said plurality of CPUs comprising two or more of a client CPU, a host CPU and/or a guard CPU.

26. The system according to claim 11, wherein said at least one processor that enables deactivation within said chip, comprises a guard CPU within said chip.

27. The system according to claim 11, wherein said at least one processor internal to said chip enables determination of said one or more configuration settings that provides maximum performance when accessing said on-chip memory, is performed by a host CPU within said chip.

28. The system according to claim 26, wherein said guard CPU within said chip establishes a handshake protocol prior to said accessing of data from said on-chip memory.

29. The system according to claim 11, wherein said at least one processor encrypts and decrypts accessed data from said on-chip memory.

30. The system according to claim 11, wherein said enabled access to said on-chip memory comprises processing a client bit stream by a plurality of CPUs within said chip, said plurality of CPUs comprising two or more of a client CPU, a host CPU and/or a guard CPU.

* * * * *